Dec. 26, 1950  E. GRIESHABER ET AL  2,535,571
CONTROL MECHANISM FOR DIESEL ENGINES
Filed April 24, 1947  2 Sheets-Sheet 2

Inventors
Emil Grieshaber
Kurt Froehlich
by Parker & Carter
Attorneys

Patented Dec. 26, 1950

2,535,571

UNITED STATES PATENT OFFICE 2,535,571

CONTROL MECHANISM FOR DIESEL ENGINES

Emil Grieshaber and Kurt Froehlich, Milwaukee, Wis., assignors to Nordberg Manufacturing Co., Milwaukee, Wis., a corporation of Wisconsin Application April 24, 1947, Serial No. 743,710

8 Claims. (Cl. 60—16)

1

Our invention relates to control mechanisms for a Diesel engine adapted to operate interchangeably on oil and gas fuel.

One object of the invention is to provide starting, operating and control mechanisms whereby the operator may, by the manipulation of a single control member or handwheel, start the engine and operate it on either gas or oil fuel.

Another object is to provide an apparatus whereby during engine operation the operator may, by the manipulation of a single control mechanism, shift over from oil to gas fuel or vice versa.

Another object of the invention is to provide a mechanism whereby a Diesel engine may operate on a mixture of both fuel oil and gas.

Other objects will appear from time to time in the specification.

When the engine burns fuel oil, it operates as a solid injection engine and the fuel injection system consists of a standard main fuel pump and fuel nozzle.

When operating on gas, the gas is admitted to the cylinders during the suction stroke through a separate gas inlet valve located in the cylinder head. This inlet valve serves as an additional intake valve for air when the engine runs on fuel oil alone.

Since the temperature of compression is not sufficient to ignite the gas, a small amount of pilot fuel oil is injected to start the ignition of the gas mixture. An injection system, separate from the main fuel injection system, is provided to keep the amount of pilot fuel oil to a minimum.

When the engine runs on a mixture of fuel oil and gas, the maximum amount of gas is manually set. The actual amount of gas and the requirement for additional fuel oil corresponding to the momentary load is automatically adjusted by the governor through the regulating shaft, which controls the gas regulating valve and the main fuel pumps.

The starting and stopping of the engine and the setting for operation on fuel oil or gas are done by a handwheel. This wheel, through a control sector and two locking sectors, operates the starting air shut-off valve and the gas control valve in such a way that only one valve is moved at a time. Both valves are three-way disk valves. In addition, the handwheel, through the control connections and a claw coupling, is connected with the regulating shaft.

Our invention is illustrated diagrammatically in the accompanying drawings wherein:

Figure 1 is a diagrammatic perspective view of

2 those parts of the Diesel engine which form the subject matter of our invention;

Like parts are indicated by like characters in the drawings.

Figure 1:
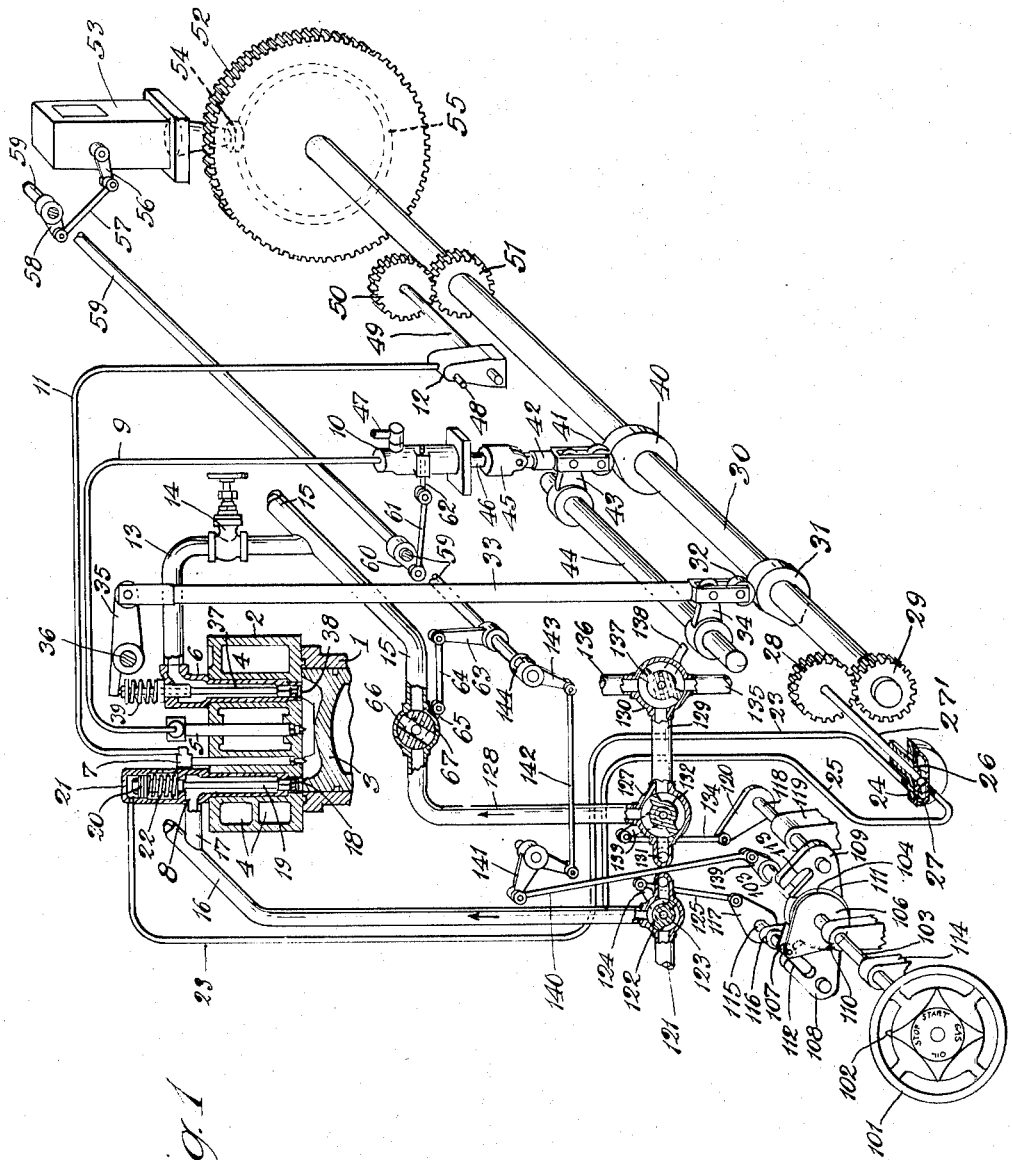

1 is the cylinder, 2 the cylinder head, and 3 the piston. 4 indicates cooling water passages in the head. The cylinder, it will be understood, is normally surrounded by a cooling water jacket, omitted for the sake of clearness. The engine, of course, has the usual connecting rod, crank shaft, bearings, crank case, cylinder block, etc., all omitted for the sake of clearness. 5 is the main fuel valve, 6 the gas valve, 7 the pilot fuel nozzle, and 8 the starting air nozzle. The main fuel valve 5 is connected by piping 9 to the main fuel pump 10. The pilot fuel nozzle 7 is connected by piping 11 to the pilot fuel pump 12. The gas valve 6 is connected by piping 13, controlled by an equalizing valve 14, to the gas header 15.

It will be understood that there are a number of cylinders in an engine such as this. The gas header 15 supplies gas to all the cylinders. There is an equalizing valve 14 whereby the relative amount of gas supplied from the gas header 15 through the pipe 13 to the gas valve 6 for each engine may be manually adjusted for proper operation.

16 is a starting air header connected by pipe 17 to the air starting valve 8. The air starting valve assembly contains a valve head 18 and stem 19 carrying a piston 20 in a cylinder 21 at the upper end of the valve. The spring 22 tends to maintain the valve seated. 23 is a pilot air pipe leading from the cylinder 21 above the piston 20 through a starting air distributor 24 to receive air through the pipe 25 from the starting air header. The starting air distributor contains a rotor 26 having one or more ports 27 adapted as it rotates to communicate one after the other with the pilot air pipes 23, one for each cylinder. The rotor 26 is driven by a shaft $27^1$ from a gear 28 in mesh with a gear 29 on the fuel cam shaft 30. 31 is the gas cam on the cam shaft 30. It is engaged by a roller 32 on the lower end of the gas valve rod 33, the gas valve rod being supported at its lower end on the guiding rocker arm 34 and engaging at its upper end gas valve rocker arm 35 pivoted at 36. The gas valve rocker arm 35 engages the gas valve stem 37. The stem 37 has at its lower end a gas valve 38 and at its upper end the valve spring 39 tending to seat the valve 38 except when overcome by gas valve rocker arm 35. 40 is the main fuel cam on cam shaft 30. It is engaged by a roller 41 at the lower end of the fuel pump cam rod 42, which rod is guided at its lower end by the rock arm 43. Rock arms 34 and 43 are rotatably mounted on the fixed shaft 44. The fuel pump cam rod 42 is pivoted on the fuel pump cross head 45 and carries the fuel pump plunger 46. The fuel goes to the main fuel pump 10 through the supply pipe 47. The pilot fuel pump 12, the details of which are not here shown and form no part of the invention, receives fuel through a supply pipe 48 and is actuated by a shaft 49 driven by a gear 50 in mesh with the gear 51 on the fuel cam shaft 30. The fuel cam shaft 30 is driven by a gear 52 from the crank shaft by gearing not here illustrated. It will be understood that the engine valves for admission of air and discharge of exhaust form an element in each cylinder but are not here illustrated, and will be actuated by cams driven from the engine crank shaft in the usual manner.

53 is a governor driven by a gear 54 in mesh with a gear 55 on the gear 52. The governor arm 56 extends outwardly from the governor and by a spring link 57 actuates a lever 58 on the regulating shaft 59. The details of the governor are conventional and not here illustrated. The regulating shaft also has a fuel oil lever 60 rigidly mounted thereon, connected by a connecting rod 61 to the fuel pump rack 62 in the main fuel pump. Movement to the left by the rack 62 tends to cut off fuel. Movement to the right tends to increase fuel in response to change in speed of the engine under the influence of the governor. 63 is a gas control lever rigidly mounted on the regulating shaft 59, connected by link 64 to the lever 65, adapted to control the gas regulating valve member 66 in the gas regulating valve 67, to control the flow of gas to the gas header 15, also responsive to the speed of the engine under control of the governor.

101 is a control handwheel. It is marked as indicated, "Stop," "Start," "Oil" and "Gas," with pointers spaced 90° apart. 102 is the fixed indicator point adapted to be related to the pointers on the control wheel. 103 is the control shaft which carries the control wheel, and has intermediate its ends a control sector 104. The control sector 104 is notched at 105 for a Geneva stop. Plates 106 on either side of the sector 104 carry a roller 107. 108 and 109 are locking sectors having surfaces 110, 111 adapted to engage the periphery of the control sector 104 and slotted at 112 and 113 to be engaged by the roller 107. The shaft 103 is supported by the bearings 114. The shaft 115 supported in bearings 116 carries at one end the starting air locking sector 108 and at the other end the starting air lever 117. The shaft 118 supported in bearings 119 carries at one end the gas control locking sector 109 and at the other end the gas control valve lever 120.

121 is a pipe leading from the starting air supply bottle or other source of air pressure. 122 is the starting air shut-off valve. Within it is a three-way valve member 123 controlled by a lever 124 joined by a connecting rod 125 to the lever 117. The three-way starting air shut-off valve is at the end of the starting air header 16 and also is connected to a vent 126 communicating with the suction manifold of the engine. 127 is the gas control valve connected by a pipe 128 to the gas regulating valve 67, connected by a pipe 129 to a gas shut-off valve 130 and by a vent 131 to the intake or suction manifold. Within the gas control valve is a three-way control member 132 having lever 133 connected by a connecting rod 134 to the lever 120.

The pipe 135 leads from a suitable source of gas under pressure to the gas shut-off valve 130. The vent 136 leads to the open air, and the three-way control member 137 in the gas shut-off valve 130 is adapted to be controlled by the manual lever 138 to connect selectively the pipes 135 and 129 for gas supplied to the engine, or the pipes 129 and 136 to connect the pipe 129 to the suction manifold, in which case the gas supply is shut off as indicated.

Figure 2:
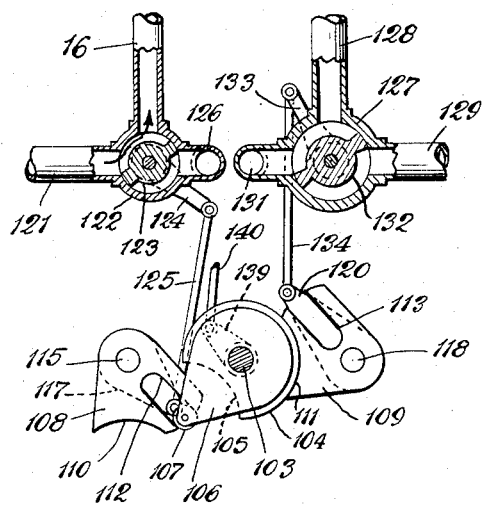
Figure 2 is a side elevation in part section of part of the control mechanism showing the engine running on starting air.

Referring now to Figure 2, the parts are in the position assumed when the handwheel 101 is in the start position with the engine running on compressed air. At this time the starting air supply enters through the pipe 121, passes through the starting air shut-off valve 122, and goes to the engine through the starting air header 16, because the control sector has rotated the starting locking sector 108 into the starting position, and as a result air under pressure is enabled to reach all of the starting valves. Meanwhile the gas control sector 109 remains in its closed position.

Under these circumstances, however, air also travels from the header 16 through the pipe 25, starting air distributor 26, port 27, pilot air pipe 23 to the air starting valve to overcome the pressure of the spring 22 and to allow starting air under pressure to flow through the valve 18 into the combustion chamber to force the piston down. This results in a rotation of the crank shaft and of course rotates the starting air distributor so that at the proper time another valve in the engine will be opened by air to permit air to enter another cylinder, and so on during the air starting operation.

Figure 3:
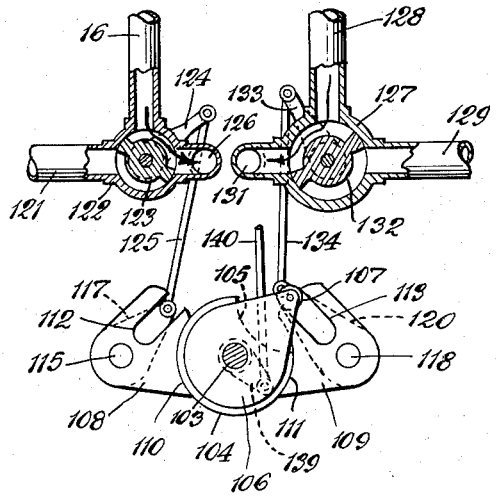
Figure 3 is a diagrammatic elevation in part section showing the position of the control parts in position for the engine to run on oil.

Referring now to Figure 3, the handwheel is in the oil position with the engine running on oil. The starting air supply valve has been rotated by the control sector to shut off the high pressure starting air, and the starting air header 16 is now vented through pipe 126 to the suction manifold. The roller 107 has just engaged the slot 113 in the gas locking sector, and the gas pipe 129 is still shut off, but the gas regulating pipe 128 is vented through the gas control valve 127 and the pipe 131 to the suction manifold. With the parts in this position, the engine operates on oil under control of the governor.

Figure 4:
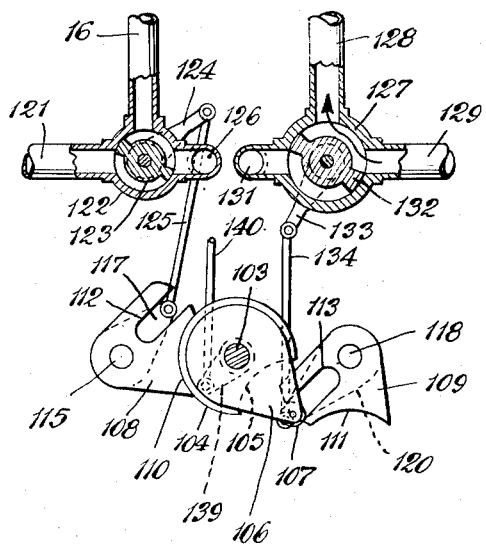
Figure 4 is a similar diagrammatic view showing the parts in position for the engine to run on gas.

Referring to Figure 4, where the engine operates on gas, there is no change in the starting air control. The Geneva stop insures that. However, the handwheel has been rotated further, and now the roller 107 has rotated the gas locking sector 109 further in a counterclockwise direction to open the gas control valve 127 so that gas under pressure is able, if the gas supply valve 130 has been moved to the open position, to enter through the pipe 135, gas shut-off valve 130, pipe 129, gas control valve 127, pipe 128, gas regulating valve 66, the gas header 15, to supply gas to the engine.

When the engine controls are in the position shown in Figure 3 or Figure 4, there will always be a minimum amount of pilot fuel supplied by the pump 12. This is necessary because the gas itself does not satisfactorily support self-ignition combustion, and it is necessary to have a minimum amount of fuel fed through the pilot fuel nozzle at all times to start ignition. When gas alone is being used and if oil is being used either exclusively or in combination with gas, still the pilot supply of oil is fed to the cylinders, and that minimum pilot supply is superposed on the gas supply or the main oil supply or on both.

It will be noted that the pilot oil supply is controlled directly by the engine and is not under governor control, because it is set by the engine's design and construction at a predetermined minimum, but the main fuel oil supply and the gas supply are both controlled by the governor 53 rotating the regulating shaft to the proper position.

When the engine starts and rotates under air pressure, it is not desirable to have any substantial amount of oil fuel or gas fed to the engine so a connection is provided between the handwheel shaft 103 and the regulating shaft 59. This connection comprises the lever 139 on the shaft 103, the connecting rod 140, bell crank lever 141, connecting rod 142 to lever 143, on claw coupling 144 at the end of the shaft 59. With the parts in the stop position as shown in Figure 1, this results in the claw coupling moving in a clockwise direction to place the gas regulating valve as shown in Figure 1 in the off position, and the fuel pump rack in the same figure in the off position. When the engine rotates it causes governor operation, but the spring link 57 between the governor and the lever 58 on the regulating shaft 59 permits governor operation under these circumstances without regulating shaft movement. When the handwheel is moved from stop position to start position, it merely moves the claw coupling 144 a little further in the shut-off direction. However, when the wheel is moved back in a clockwise direction, this results in moving the claw coupling in a counterclockwise direction and leaves the regulating shaft 59 to rock under the influence of the governor in the normal operating cycle.

The use and operation of our invention are as follows:

With the handwheel 101 in the stop position, as shown in Figure 1, the engine side of the starting air shut-off valve 122 and the gas control valve 127 are vented to the suction manifold of the engine not illustrated, which is at atmospheric pressure while the engine stands still. The regulating shaft 59 is held in the fuel-off position by the claw coupling 144.

In order to start the engine, the handwheel 101 is turned 90° to the left (counterclockwise) into the start position. The gas control valve 127 is not moved; the regulating shaft 59 is still kept in the fuel-off position; the starting air shut-off valve 122 is opened, connecting the supply pipe 121 to the starting valves 8 in the cylinders. At the same time, the starting air is admitted through a pipe 25 to the starting air distributor 24, which is driven by the cam shaft 30. This distributor times the opening and closing of the starting valves. At least one passage through the distributor 24 is open by way of the pilot air pipe 23 to the top of the starting valve 8, which is thus opened and admits air to the cylinder 1. The engine now turns over on air.

After the engine has made two or three revolutions, the handwheel is turned 180° to the right (clockwise) into the oil position. The starting air shut-off valve 122 shuts off the air supply, and whatever air is trapped in the starting air header 16 is vented into the suction manifold. The control conections 139—144 are turned into the fuel-on position, Figure 3, so the governor 53 through the spring link 57 acts on the regulating shaft 59 and moves the fuel pump racks 62 into the position where the correct amount of fuel oil is supplied to the engine, according to its load. The gas control valve 127 is still in its original position—that is, the gas supply is shut off. However, there is a flow of air from the suction manifold through the control valve 127 and the gas inlet valve 6, on account of the relative vacuum created in the cylinder during the suction stroke of the engine. This applies to supercharged, as well as to non-supercharged engines.

In order to run the engine on gas, the handwheel is turned another 90° clockwise into the gas position, Figure 4. This can be done directly, without stopping in the oil position.

The starting air shut-off valve 122 remains in the shut-off position and the control connections remain in the fuel-on position. The gas control valve 127 is turned and thereby shuts off the scavenging air supply and opens the gas supply. The gas flows through the gas regulating valve 66, through the gas header 15, through the gas inlet valves 6, which are open during the suction stroke of the engine, and into the cylinders 1, where it mixes with the air. The governor now moves the regulating shaft toward the gas range. If the available gas supply is sufficient, the governor will cut out the main fuel pumps entirely and regulate the engine through the gas regulating valve only.

An equalizing valve 14 is provided on each cylinder between the gas header 15 and the gas inlet valves 6, which is manually adjusted to balance the load between the different cylinders.

Figure 5:
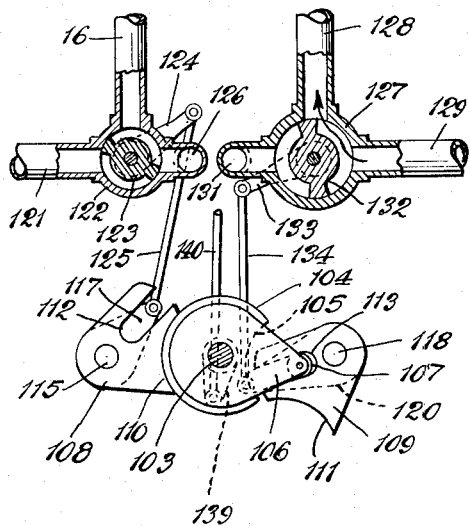
Figure 5 is a similar diagrammatic view showing the parts with the three-way valve set to throttle the gas supply.

In order to run the engine on a mixture of oil and gas, the gas control valve 127 is partly closed, as shown in Figure 5, by moving the handwheel 101 to the left. By thus limiting the gas supply, the amount of gas may not be sufficient for the engine to carry full load and the governor will move the regulating shaft 59 into the fuel oil range and supply the additional amount of fuel oil required for the load. When the load drops off, the governor 53 reduces only the amount of fuel oil at first until the fuel oil is shut off and the engine is regulated on gas only.

We claim:

1. Control means for Diesel engines and the like including an air starting valve, a liquid fuel control valve, a gas control valve, gas and liquid fuel regulating means, a governor adapted to control the gas and the fuel regulating means, a single manually controlled member adapted selectively to operate the starting means, the liquid fuel control means and the gas control means, and means associated with and operated by said manually controlled means for holding the governor out of operation during the starting cycle.

2. Control means for an internal combustion engine, including a single manually operated member, an air starting valve, a gas valve and an oil supply means, all directly operated by the manual control means, a governor adapted to control the supply of gas and oil in consonance with engine speed, and means controlled by the manual control means for rendering the governor control inoperative during the engine's starting cycle and for automatically permitting operation of the governor to control gas and oil thereafter.

3. In an internal combustion engine, a cam shaft, a gas fuel supply valve, means actuated by the cam shaft for opening and closing it, a pump adapted to inject liquid fuel into the engine, and means controlled by the cam shaft for timing such injection, a governor and means responsive to the governor for controlling the amount of gas and oil fed to the engine, a manual starting control member adapted to open and close the air starting valve and locking means actuated by the manual starting control member when such member is in the air starting valve open position, to prevent governor control.

4. In a Diesel engine, separate means for admitting starting air, fuel oil and gas to the engine, unitary manually controlled means for operating said admission means, locking means actuated by the manually controlled means to lock the air and gas admission means in closed position except during the time when one or other of them is positively opened by the manually controlled means.

5. In a Diesel engine, air, gas and oil supply means, a single unitary means for controlling said three supply means, means associated with the control means for normally locking the gas and air supply means in closed position, and means for positively opening the gas and air control means.

6. In a Diesel engine, air, gas and oil supply means, a single unitary means for controlling said three supply means, means associated with the control means for normally locking the gas and air supply means in closed position, and means for positively opening the gas and air control means, said means being separately operated, there being an interlocking means to prevent simultaneous opening thereof.

7. A control means for Diesel engines and the like, including a hand wheel, a control sector adapted to be operated by the hand wheel, a pair of levers adapted normally to be held against rotation by the control sector, a member on the control sector adapted to engage selectively, one at a time, one of said levers to rotate it, a gas control valve, an air control valve, and fuel oil control means, a lever associated with the control sector adapted to control the fuel oil control means, and a connection between the two levers above referred to and the air control and gas control valves, respectively.

8. In an engine, an air control valve, a gas control valve, and a liquid fuel control means, a control shaft, a lever on the shaft, a connection between it and a liquid fuel control means, a control sector mounted for rotation on the shaft, levers in opposition to the control sector adapted normally to be held against rotation thereby, a connection between one of them and the gas control valve, and between the other and the air control valve, the control sector being relieved through a portion of its periphery, an actuating member carried by the sector adjacent such relieved portion and adapted selectively to engage one or other of the levers to rotate such lever when the position of the control sector permits such rotation, and means for manually operating the control shaft.

EMIL GRIESHABER.
KURT FROEHLICH.

REFERENCES CITED

The following references are of record in the file of this patent:

UNITED STATES PATENTS

| Number | Name | Date |
|---|---|---|
| 1,352,717 | Zbinden | Sept. 14, 1920 |
| 1,846,237 | Weiche | Feb. 23, 1932 |
| 2,400,219 | Barnaby et al. | May 14, 1946 |
| 2,400,247 | Miller et al. | May 14, 1946 |
| 2,409,300 | Miles | Oct. 15, 1946 |
| 2,470,747 | Shepherd | May 17, 1949 |

FOREIGN PATENTS

| Number | Country | Date |
|---|---|---|
| 404,612 | Germany | Dec. 31, 1922 |
| 608,987 | Germany | Oct. 17, 1933 |
| 545,141 | Great Britain | May 12, 1942 |